US011676484B2

(12) United States Patent
Jarrett et al.

(10) Patent No.: US 11,676,484 B2
(45) Date of Patent: Jun. 13, 2023

(54) GOVERNING THE OPERATION OF AN ASSET WITHIN A GEO-ZONE (71) Applicant: HIGHWAY RESOURCE SOLUTIONS LTD, Bottesford (GB)

(72) Inventors: James Jarrett, Bottesford (GB); Roger Poeth, Bottesford (GB)

(73) Assignee: HIGHWAY RESOURCE SOLUTIONS LTD, Bottesford (GB)

( * ) Notice: Subject to any disclaimer, the term of this patent is extended or adjusted under 35 U.S.C. 154(b) by 0 days.

(21) Appl. No.: 16/754,037

(22) PCT Filed: Oct. 8, 2018

(86) PCT No.: PCT/GB2018/052874
§ 371 (c)(1),
(2) Date: Apr. 6, 2020

(87) PCT Pub. No.: WO2019/069105
PCT Pub. Date: Apr. 11, 2019

(65) Prior Publication Data
US 2020/0327805 A1 Oct. 15, 2020

(30) Foreign Application Priority Data

Oct. 6, 2017 (GB) ..................................... 1716442

(51) Int. Cl.
*G08G 1/095* (2006.01)
*B60Q 7/00* (2006.01)
(Continued)

(52) U.S. Cl.
CPC ........... *G08G 1/0145* (2013.01); *E01F 9/608* (2016.02); *E01F 9/692* (2016.02); *G08G 1/0955* (2013.01); *H04W 4/021* (2013.01)

(58) Field of Classification Search
CPC ..... G08G 1/0145; G08G 1/0955; E01F 9/608; E01F 9/692; H04W 4/021
See application file for complete search history.

(56) References Cited

U.S. PATENT DOCUMENTS 5,939,986 A * 8/1999 Schiffbauer ........... B66C 15/045
340/541
6,084,510 A * 7/2000 Lemelson .............. G08G 1/164
382/104
(Continued)

FOREIGN PATENT DOCUMENTS

FR 2886952 12/2006
FR 3009758 2/2015
(Continued)

OTHER PUBLICATIONS

Abdelsalam et al., Managing uncertainty modeling users in location-tracking applications (Year: 2004).*
(Continued)

*Primary Examiner* — Quang Pham
(74) *Attorney, Agent, or Firm* — FisherBroyles, LLP; Jason P. Mueller (57) ABSTRACT A method of operating an incursion warning system for a work zone, the incursion warning system comprising: a plurality of sensor units arranged about a perimeter of the work zone; and a plurality of alarm units each comprising one or more of an audio, visual or haptic alarm operable to warn a workforce of a potential danger in response to a detected breach into the work area; the method comprising: establishing a geo-zone delimiting a geographical area that includes at least part of the work zone; and a set of rules associated with the geo-zone; deriving an instruction for one of the alarm units determined to be in the geo-zone from the set of rules based on a characteristic of the alarm unit and a characteristic(s) of one or more other alarm units determined (Continued)

to be within the geo-zone; and wherein the instruction is derived in response to a change in a characteristic of the alarm unit and/or the one or more other alarm units and/or one or more of the sensor units within the geo-zone.

12 Claims, 4 Drawing Sheets (51) Int. Cl.
| | |
|---|---|
| *E01F 9/00* | (2016.01) |
| *G08G 1/00* | (2006.01) |
| *G08G 1/01* | (2006.01) |
| *E01F 9/608* | (2016.01) |
| *E01F 9/692* | (2016.01) |
| *G08G 1/0955* | (2006.01) |
| *H04W 4/021* | (2018.01) |

(56) References Cited

U.S. PATENT DOCUMENTS

| | | | |
|---|---|---|---|
| 6,512,451 B1* | 1/2003 | Eslambolchi | E01F 9/654 340/425.5 |
| 6,608,559 B1* | 8/2003 | Lemelson | G08B 15/004 382/104 |
| 6,670,887 B2* | 12/2003 | Dungan | G08B 21/16 340/632 |
| 6,693,585 B1* | 2/2004 | MacLeod | G01S 5/0027 342/357.55 |
| 6,856,253 B1* | 2/2005 | Crook | G08B 21/14 340/539.11 |
| 7,030,777 B1 | 4/2006 | Nelson et al. | |
| 7,230,546 B1* | 6/2007 | Nelson | G08G 1/0955 340/940 |
| 8,442,750 B1 | 5/2013 | Tran et al. | |
| 8,819,313 B1 | 8/2014 | Walther et al. | |
| 9,183,731 B1* | 11/2015 | Bokhary | H04W 4/90 |
| 9,288,637 B2* | 3/2016 | Moeller | H04W 4/027 |
| 9,437,109 B1* | 9/2016 | Stafford | B60Q 7/00 |
| 9,497,585 B1* | 11/2016 | Cooley | H04W 4/029 |
| 9,532,172 B1* | 12/2016 | Gerken, III | H04W 4/023 |
| 9,870,719 B1* | 1/2018 | Watkins | G10L 25/21 |
| 9,973,892 B1* | 5/2018 | Parshin | H04W 68/06 |
| 10,104,605 B1* | 10/2018 | Parshin | G06Q 30/0261 |
| 10,179,595 B2* | 1/2019 | Carlson | B61L 25/021 |
| 10,403,115 B2* | 9/2019 | Hwang | G01C 21/362 |
| 10,757,531 B1* | 8/2020 | Parshin | H04W 16/18 |
| 10,959,056 B1* | 3/2021 | Alsahlawi | G06Q 50/265 |
| 10,984,644 B1* | 4/2021 | Alsahlawi | G08B 25/10 |
| 11,173,607 B2* | 11/2021 | Lee | G08B 21/22 |
| 11,205,345 B1* | 12/2021 | Mulligan | G08G 1/0112 |
| 2002/0062263 A1* | 5/2002 | Katou | G06Q 10/087 379/93.12 |
| 2002/0175831 A1* | 11/2002 | Bergan | G08G 1/081 340/908 |
| 2003/0151508 A1* | 8/2003 | Frame | B66C 15/045 340/8.1 |
| 2005/0001720 A1* | 1/2005 | Mason | G01S 19/17 340/539.2 |
| 2005/0202830 A1* | 9/2005 | Sudit | H04W 4/029 455/456.3 |
| 2007/0222640 A1 | 9/2007 | Guelzow, II et al. | |
| 2008/0018459 A1* | 1/2008 | Derrick | G07C 1/20 455/456.1 |
| 2008/0094230 A1* | 4/2008 | Mock | G08B 21/22 340/539.13 |
| 2009/0247189 A1* | 10/2009 | Sennett | H04W 4/02 455/456.2 |
| 2009/0325595 A1* | 12/2009 | Farris | G01C 21/206 455/456.1 |
| 2009/0325606 A1* | 12/2009 | Farris | H04L 67/51 455/456.3 |
| 2010/0066545 A1* | 3/2010 | Ghazarian | G08B 21/0258 340/573.4 |
| 2011/0037599 A1* | 2/2011 | Johnson, Jr. | H04W 4/023 340/632 |
| 2011/0063121 A1* | 3/2011 | Le Devehat | B67D 9/02 340/669 |
| 2012/0126996 A1* | 5/2012 | McCarthy | G08G 1/166 340/902 |
| 2012/0238286 A1* | 9/2012 | Mallavarapu | H04W 4/021 455/456.1 |
| 2012/0268267 A1* | 10/2012 | Anderson | B60R 25/33 340/539.1 |
| 2013/0091452 A1* | 4/2013 | Sorden | G06F 30/20 715/771 |
| 2013/0154825 A1* | 6/2013 | Anderson | F16P 3/147 340/539.11 |
| 2014/0195664 A1* | 7/2014 | Rahnama | G06F 16/24575 709/223 |
| 2015/0091716 A1* | 4/2015 | Hathaway | B60Q 5/006 340/435 |
| 2015/0145686 A1* | 5/2015 | Johnson, Jr. | H04W 4/33 340/632 |
| 2016/0073230 A1* | 3/2016 | Rahman | H04W 4/029 455/456.3 |
| 2016/0304028 A1* | 10/2016 | Hathaway | G01S 13/931 |
| 2016/0321898 A1* | 11/2016 | Braxton | G08B 13/2494 |
| 2017/0164151 A1* | 6/2017 | Gavin | G08B 21/0266 |
| 2017/0185905 A1* | 6/2017 | Eberbach | G08B 21/12 |
| 2017/0243457 A1* | 8/2017 | Milbrand | G08B 21/0269 |
| 2017/0289734 A1* | 10/2017 | Yocam | H04W 4/80 |
| 2017/0302750 A1* | 10/2017 | Greenberger | H04L 67/55 |
| 2017/0318417 A1* | 11/2017 | Kusumoto | H04W 4/021 |
| 2018/0082250 A1* | 3/2018 | Cho | G06Q 10/0835 |
| 2018/0103343 A1* | 4/2018 | Vangipuram | H04W 4/021 |
| 2018/0144628 A1 | 5/2018 | Nicholson et al. | |
| 2018/0157264 A1* | 6/2018 | Isaacs | G08G 1/00 |
| 2018/0186392 A1* | 7/2018 | Da Costa | B61L 3/008 |
| 2018/0244292 A1* | 8/2018 | Bailey | B61L 23/24 |
| 2018/0349954 A1* | 12/2018 | Mehta | H04L 67/52 |
| 2019/0026643 A1* | 1/2019 | Muijs | G06N 7/01 |
| 2019/0062109 A1* | 2/2019 | Nanjappan | B66B 5/0056 |
| 2019/0156642 A1* | 5/2019 | Royal | H04W 4/029 |
| 2019/0220678 A1* | 7/2019 | Guo | G06F 18/23 |
| 2019/0239027 A1* | 8/2019 | Chisaka | G08B 21/043 |

FOREIGN PATENT DOCUMENTS

| | | |
|---|---|---|
| FR | 3023236 | 1/2016 |
| GB | 2486075 | 6/2012 |
| GB | 2535320 | 8/2016 |
| WO | 2016077812 | 5/2016 |

OTHER PUBLICATIONS

Zhao et al., Data analysis on applying real time tracking in production control of construction (Year: 2017).*
Adair et al., Work Zone Intrusion Warning System (Year: 2015).*
Awolusi et al., Active Work Zone Safety Preventing Accidents Using Intrusion Sensing Technologies (Year: 2019).*
Rey-Marchan et al., Virtual Fence System Based on IoT Paradigm to Prevent Occupational Accidents in the Construction Sector (Year: 2021).*
Ozan et al., Requirements Analysis for the System Level Design of Smart Work Zones (Year: 2019).*
Byung-Wan et al., Robust Construction Safety System (RCSS) for Collision Accidents Prevention on Construction Sites (Year: 2019).*
Chan et al., Incorporating Worker Awareness in the Generation of Hazard Proximity Warnings (Year: 2020).*
Ruff et al., Application of radio-frequency identification systems to collision avoidance in metal nonmetal mines (Year: 2001).*

* cited by examiner

GOVERNING THE OPERATION OF AN ASSET WITHIN A GEO-ZONE

This application is a national stage entry under 35 U.S.C. 371 of PCT Patent Application No. PCT/GB2018/052874, filed Oct. 18, 2018, which claims priority to United Kingdom Patent Application No. 1716442.7, filed Oct. 6, 2017, the entire contents of each of which is incorporated herein by reference.

There is described a method of governing the operation of an asset within a geo-zone, and a system that implements said method. The method and system were conceived for use in the field of managing and monitoring perimeters, in particularly but not exclusively for managing temporary perimeters used during road works to delineate between an open carriageway and a work area. Nevertheless, it is envisaged that the invention may be applicable to governing the operation of assets within a geo-zone more generally.

When undertaking roadworks, it is common to close off a portion of carriageway to traffic, e.g. one or more lanes, to provide a safe work area for those carrying out the works. This is commonly done using channelizers such as cones, barrels, posts, vertical panels or barricades.

Channelizers provide a convenient means of temporarily closing off a work area to traffic, being straightforward to carry to and from a work area and relatively cheap to replace. However a problem is that channelizers alone provide an ineffective physical barrier to vehicles driven unintentionally or otherwise into the work area.

Various systems have been proposed to detect incursion of vehicles through roadwork perimeters. An example system is described in the applicant's earlier patent GB2486075A which comprises multiple sensor units arranged to be mounted along a perimeter and which transmit a wireless signal upon detection of an impact. The system includes an alarm unit that can be positioned proximate the workers and is arranged to produce an alarm upon receiving an alert signal. The present invention came about through further development of the incursion detection system described in GB2486075A.

According to a first aspect of the invention there is provided a method comprising:
establishing a geo-zone and a set of rules associated with the geo-zone;
deriving an instruction for an asset in the geo-zone from the set of rules based on a characteristic of the asset and a characteristic of one or more other assets within the geo-zone; and wherein the instruction is derived in response to a change in a characteristic of the asset and/or the one or more other assets within the geo-zone.

The method allows for dynamic control of assets within the geo-zone.

A characteristic of the asset may include one or more of: the status of the asset; the position of the asset within the geo-zone and/or relative to features within the geozone; and the relative position of the assets with respect of other assets.

A characteristic of the one or more other assets may include: the asset's class, status, position within the geozone and/or relative to features within the geozone of any other asset in the geo-zone. Other possible characteristics include one or more of the total number of other assets in the geo-zone, the number of other assets in the geozone sharing a particular characteristic, the position of one or more of the other assets within the geo-zone and/or relative to another asset; the relative position of one or more other assets with respect one another or the other assets, a status of one or more other assets in the geo-zone.

The method may include, in response to a change in a characteristic of the asset and/or the one or more other assets within the geo-zone, determining one or more assets in the geo-zone that need to perform a function as a result of the change, and deriving an instruction for those one or more assets.

The derived instruction is preferably transmitted to the asset m order to govern operation of the asset. In the use of the method for a perimeter strike and or incursion warning application, the asset may comprise an alarm means and or a sensor means. An alarm unit, in response to receiving an appropriate instruction may provide one or more of an audible, visual or haptic alarm.

The class may provide an indication of the functional capability and/or intended function of the asset. For example, in the application of a perimeter strike and or incursion warning application, the asset's class may be an indication of whether the asset comprises an alarm means, a sensor means or both.

Example statuses for an asset in a perimeter warning application include: the asset is not functioning correctly; the asset is functioning correctly; the asset has detected a strike and/or incursion; and the asset has a low battery.

The asset may be arranged to transmit status information, e.g. in the form of a status message, in response to a change in a characteristic of the asset. Favourably each asset is arranged to transmit status information in response to a change in a characteristic of the asset.

The instruction may be derived (and favourably transmitted to the selected asset(s) in response to receiving a status message from one of the assets.

The derived instruction may be transmitted to multiple-assets within the geo-zone.

A second different instruction may be derived in response to receiving a status message from the asset and transmitted to a second asset in the geo-zone.

The second instruction for the second asset within the geo-zone may be derived from the set of rules based on a characteristic of the second asset and, optionally, a characteristic of other assets within the geo-zone. The second instruction may be transmitted to the second asset to govern the operation of the second asset within the geo-zone.

The method may be a computer implemented method.

According to another aspect of the invention there is provided a method for providing a perimeter strike and/or incursion warning for a work zone, the method comprising
establishing a geo-zone delimiting a geographical area that includes the work zone; and a set of rules associated with the geo-zone;
deriving an instruction for an alarm unit in the geo-zone from the set of rules based on a characteristic of the alarm unit and a characteristic(s) of one or more other alarm units within the geo-zone;
and wherein the instruction is derived in response to any one of: a change in a characteristic of the alarm unit; a change in characteristic of other alarm units in the geo-zone; and a status message from a sensor unit within the neo-zone indicative of a perimeter breach.

The alarm unit may be arranged and used to provide an alarm to warn members of a workforce of a potential breach into the work area.

The method may include selecting an alarm unit for which an instruction needs to be derived in response to any one of: a change in a characteristic of the alarm unit; a change in characteristic of one or more other alarm units in the geo-zone; and a status IO message from a sensor unit within the geo-zone indicative of a perimeter strike and/or breach.

The above described methods makes the management of assets where there are a plurality of geo-zones (e.g. managing a plurality of perimeter warning systems for a plurality of work areas) far easier as any suitable asset from a pool of assets can be taken and used in any of the geo-zones without the need to program the asset in advance of entering the geo-zone with instructions specific for its role within that geo-zone.

In a further aspect there is provided a method of managing a set of temporary traffic signals used to control flow of traffic, the method comprising: establishing a geo-zone delimiting a geographical area that includes temporary traffic signals in order define said traffic signals as a set of traffic signals; identifying a traffic condition characteristic for each traffic signal of the set, the traffic condition characteristic being indicative of a journey time for traffic approaching the respective traffic signal;

establishing a set of rules for the set of traffic signals to control the flow of traffic; and deriving an instruction for at least one of the traffic signal from the set of rules based on the traffic condition characteristic of at least one of the traffic signal of the set; and wherein the instruction is derived in response to a change in the status of at least one of the traffic signals and/or a change in the traffic condition characteristic of at least one of the traffic signals of the set.

In the method thereby provides means to vary the duration that traffic is permitted to travel in each direction so as to accommodate unbalanced traffic volume travelling towards the traffic signals from different directions.

According to another aspect of the invention there is provided a system comprising:
a control means; and
a plurality of assets within the geo-zone;
the control means adapted to establish a geo-zone and a set of rules associated with the geo-zone, and arranged to derive an instruction for one of the plurality of assets within the geo-zone from the set of rules based on a characteristic of the asset and/or a characteristic of plurality of assets within the geo-zone; wherein the instruction is derived in response to a change in a characteristic of the asset and/or the one or more other assets within the geo-zone.

The control means, which may also be referred to as a controller, may be implemented by one or more suitably programmed processors.

The invention will now be described by way of example with reference to the following figures in which.

Figure 1:
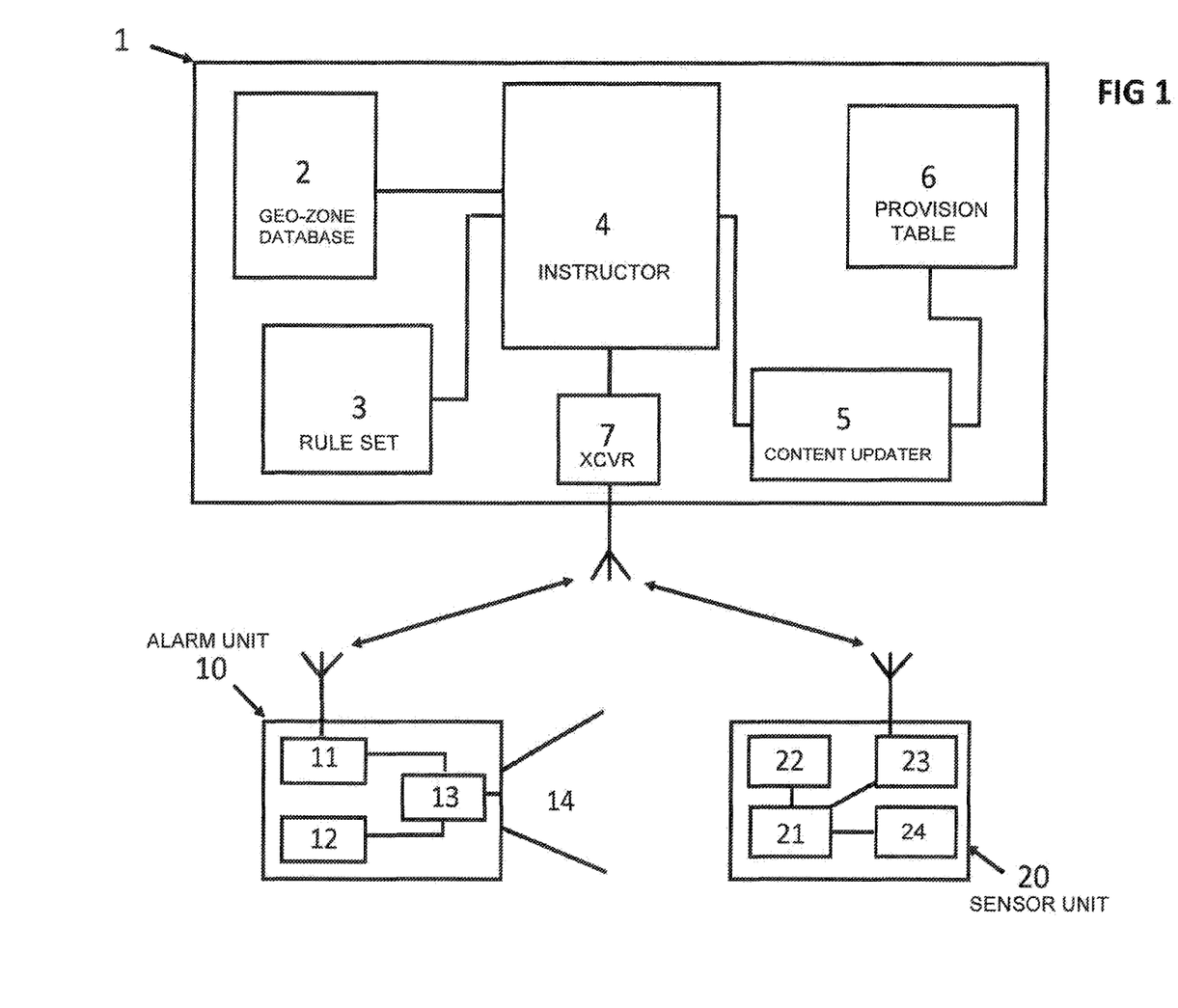
FIG. 1 is a schematic of a system used to monitor and warn of an incursion into a work zone.

With reference to FIG. 1 there is shown a schematic of a system used to monitor and warn of a perimeter strike and/or perimeter breach such as by a vehicle.

The system comprises a control mechanism 1 that includes a geo-zone database 2 that holds details of a geo-zone 32, e.g. the coordinates of the geo-fence associated with a work area 33 for which the incursion warning system is to be used; a rule set 3; an instructor 4 and content updated 5; a provision table 6 that holds details of each alarm unit 10 and sensor unit 20 determined to lie within the geo-zone 32.

The control mechanism 1 is implemented using appropriately programmed computer hardware using techniques known to those skilled in the art. Typically the control mechanism 1 will be run on a server at a location remote from the geo-zone 32.

The control mechanism 1 communicates to the alarm units 10 and sensor units 20 via a transceiver 7. Communication between the control mechanism 1 and the alarm and sensor units 20 may occur using Internet and cellular protocols (e.g. GPRS) via a combination of wired and wireless communication links.

Using a software application, an operator uses geo-fencing to create a virtual perimeter define the geo-zone 32 that maps over a geographical area including the work area 33. A geo-zone 32 may be generated dynamically around one or more geographical points, e.g. a radius about a location, or may be formed manually. The software program may incorporate mapping data in order to facilitate the establishment of the geo-zone 32. The mapping data of an area surrounding a work area 33 may be displayed to the operator who can, using the software application overlay a graphical representation of the geo-fence. The techniques for establishment of a geo-zone using geo-fencing will be familiar to those skilled in the art.

Each alarm unit 10 includes a navigational satellite system (e.g. GPS) receiver 11, a transceiver 12, processor 13 and an alarm generator 14. The nature of the alarm unit 10 may vary. Multiple types of alarm unit 10 may be used in a works area 33. One embodiment of alarm unit 10 is adapted to be positioned near the workforce to alert multiple workers simultaneously. Such units may include a visual (e.g. flashing light) and/or siren to provide an alert. Alternatively the alert unit 10 may be implemented through a software program run on a portable electronic device such as a watch or smart phone using the hardware features of the electronic device, e.g. the speakers and screen to provide the alert.

Each sensor unit 20 includes a global positioning receiver 21, processor 22, transceiver 23, and impact sensor(s) and/or proximity sensors 24 such as optical or ultrasonic to detect transmit a perimeter strike and/or breach by a vehicle.

Figure 2:
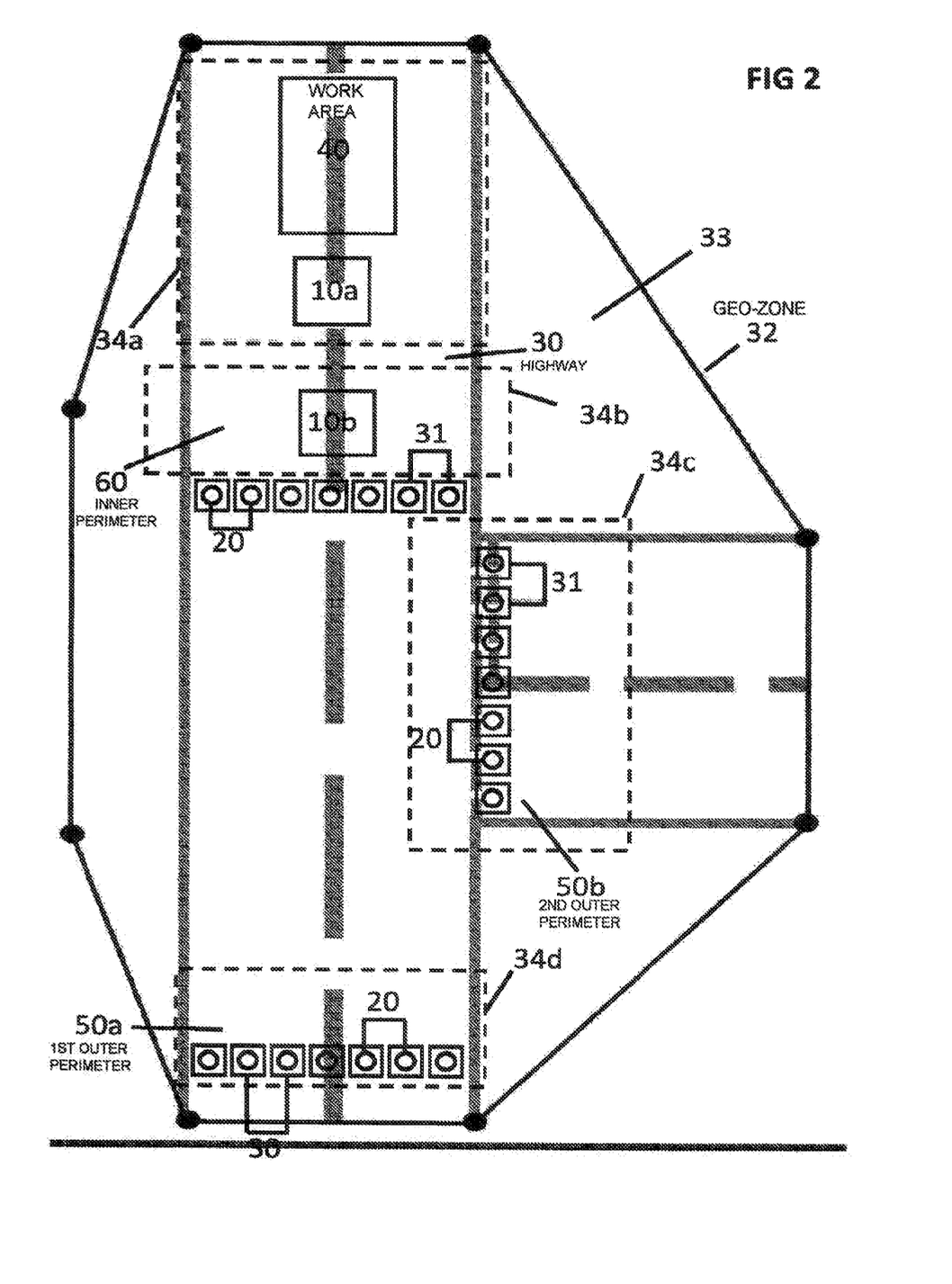
FIG. 2 is a schematic plan view of incursion warning system used for a highway that has been closed off to provide a work zone.

FIG. 2 is a schematic plan view of a highway 30 closed off using channelizers 31 such as cones to provide a works zone including a working area 40. Alarm units 10 and sensor units 20 of the perimeter incursion warning system are arranged to detect and provide warning in the event of a potential breach or strike of the cone perimeter.

The geo-zone 32 is generated to delimit a geographical area that includes the works area 33. Alarm units 10 and sensor units 20 determined to reside within the geo-zone are assigned to the incursion warning system for the works area.

The rule set 3 is generated for the geo-zone to govern the operation of the alarm units in the event of perimeter strike and/or breach. The rule set 3 may be generated at least in part automatically using templates based on the highway layout and relative positions of the work area, or completely manually by an operator.

The rule set 3 may comprise sets of conditional statements used by the instructor 4 to determine which alarm units 10 should be activated, and the nature of the activation in the event of detection of a perimeter strike/breach based on the location of perimeter breach relative to the working area 40, as determined by the position of the sensor units 20 that detected the strike/breach, and the relative positions of alarm units 10 or other sensor units 20 of the warning system to the working area 40.

When switched on, each alarm unit 10 and sensor unit 20 sends a status message to the control mechanism 1 that includes a unique identifier, characteristic information (e.g. whether it is a sensor unit or alarm unit) and GPS information of it location. Those units determined from their location data to fall within the geo-zone 32 as defined in the geo-zone database 2, and thus form part of the perimeter incursion warning system, are included in the provision database 6 by the content updater 5.

In addition to the aforementioned working area 40 in which the works are taking place, the work zone includes a first outer perimeter 50A closing off the highway and a second outer perimeter SOB closing off a minor road that joins the highway between the first outer perimeter SOB and the working area 40. In addition there is provided an inner perimeter 60 arranged more proximate to the working area 40 than either outer perimeter 50A 50B. Both outer perimeters 50A 50B and inner perimeter 60 are defined by lines of cones 31 (or other channelizers).

Sensor units 20 are mounted to and/or positioned adjacent at least some (preferably all) the cones 31 forming each of the outer and inner perimeters in order to detect a strike to the perimeter by a vehicle and/or an incursion by a vehicle.

In addition to the primary geo-zone 32, sub geo-zones 34A-D are construct around each of the first outer perimeter, second outer perimeter, inner perimeter and working area. A sensor unit or alarm unit that is determined to reside within one of these sub-geo-zones will be associated with the relevant feature of the perimeter.

A first alarm unit 10A is situated most proximate the working area 40, a second portable alarm unit 10B is carried by a watchman posted adjacent the inner perimeter 60.

The rule set 3 for the perimeter incursion warning system is arranged to adapt the alarm procedure in response to the watchman moving away from the inner perimeter 60 (e.g. to leave the sub zone 34B) or leaving the work zone 32. For example, the rule set 3 may specify that when a strike and/or breach is detected at either outer perimeters 50A 50B and the watchman is proximate the second perimeter 60 an instruction should be sent to the second alarm unit 10B to warn the watchman of a strike and/or breach. This allows the watchman to prepare for the possibly of a trespassing vehicle such that they can take action to prevent it passing the inner perimeter 60 and/or visit the location of the incident (based on location data provided by the sensor unit 20 and/or it associated with a particular subzone) to check and, if necessary, repair the outer perimeter. Optionally, an instruction may also be sent to the first alarm unit 10A to cause it to provide a low level alert to warn the workers of a potential threat.

If it is determined that the inner perimeter 60 is breeched, through a status message indicative of a strike/incursion from a sensor unit 20 associated with the inner perimeter sub geo-zone, the rule set 3 may provide that the first alarm 10A emits a high level alert to warn the workforce of impeding danger so that they can take evasive action.

If the watchman (and thus the second alarm unit 10B) moves out of the work zone 32 or is more proximate to the first outer perimeter 50A than the inner perimeter 60, the rule set 3 may provide, upon strike and/or breach of the second outer perimeter 50B that an instruction be transmitted to the first alarm unit 10A to cause it to provide the high level alert.

In this way the system can adapt so as to avoid unnecessarily disrupting the workforce following a potential breach when intermediate protection is in place, but ensures ample warning is given to the workforce when no intermediate protection is available. It also reduces the potential for human error.

It will appreciated that the above describes a simple arrangement in order to aid understanding. However, the system and method can be equally applied to more complex work area arrangements that include many outer perimeters with multiple inner perimeters and working areas. In addition the system can be modify to control other additional units such as, for example, relay units for relaying status messages from sensor units to the controlling mechanism. Because the system is able to control the operation of a unit based on its placement in the workzone and changes to the arrangement of other units in the work zone, the system enables multi function units to be deployed without the need for specific programming by workman in the work area in order to perform a specific function depending on their intended use or placement.

Figure 3:
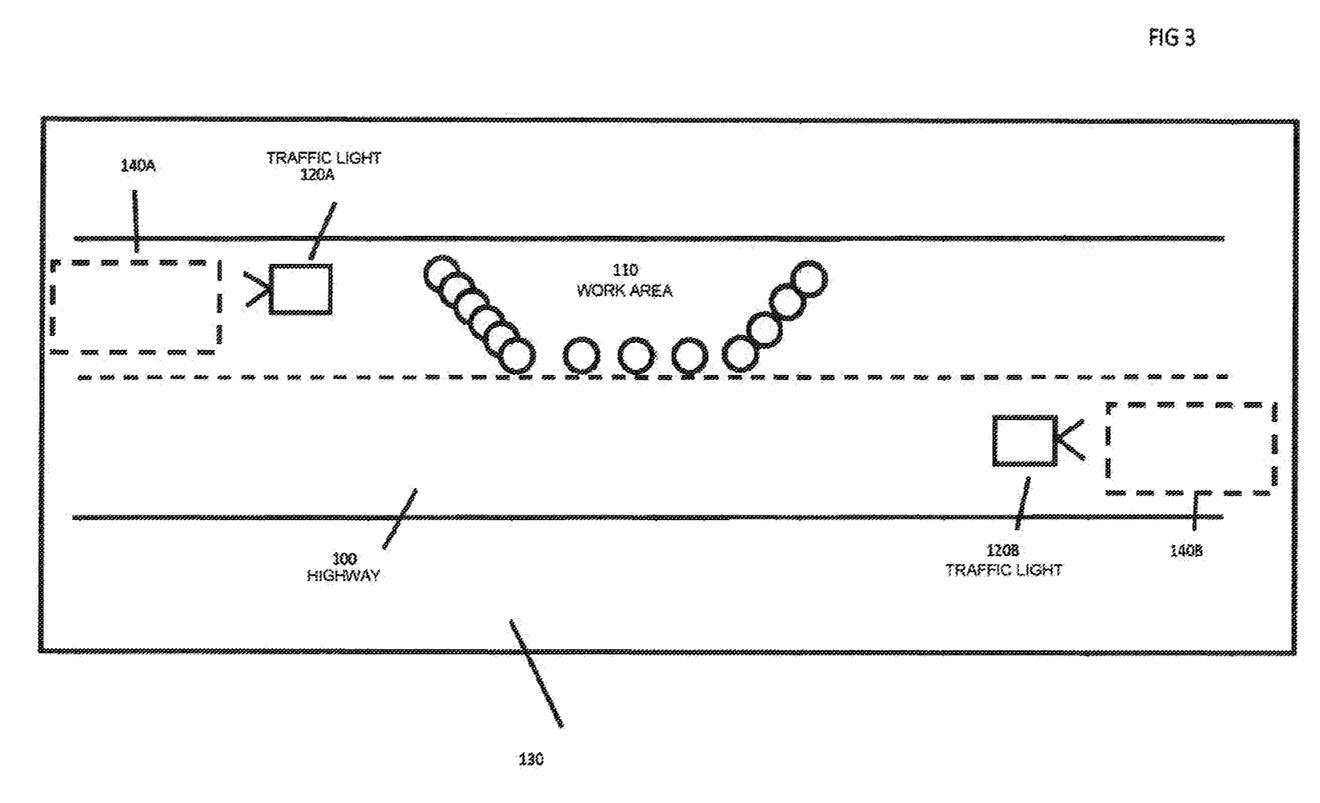
FIG. 3 is a schematic plan view of a set of a highway partially closed off for roadwork with a traffic light system to control traffic flow.

An alternative application is described with reference to FIGS. 3 and 4. There is shown a highway 100 that is partially obstructed by road works 110. Traffic flow past the road works 110 is controlled by temporary traffic lights 120A 120B.

A geo-zone 130 is created that encompasses the road works 120 and which include portions 140A 140B of the highway 100 that extend away from the road works in either direction.

Figure 4:
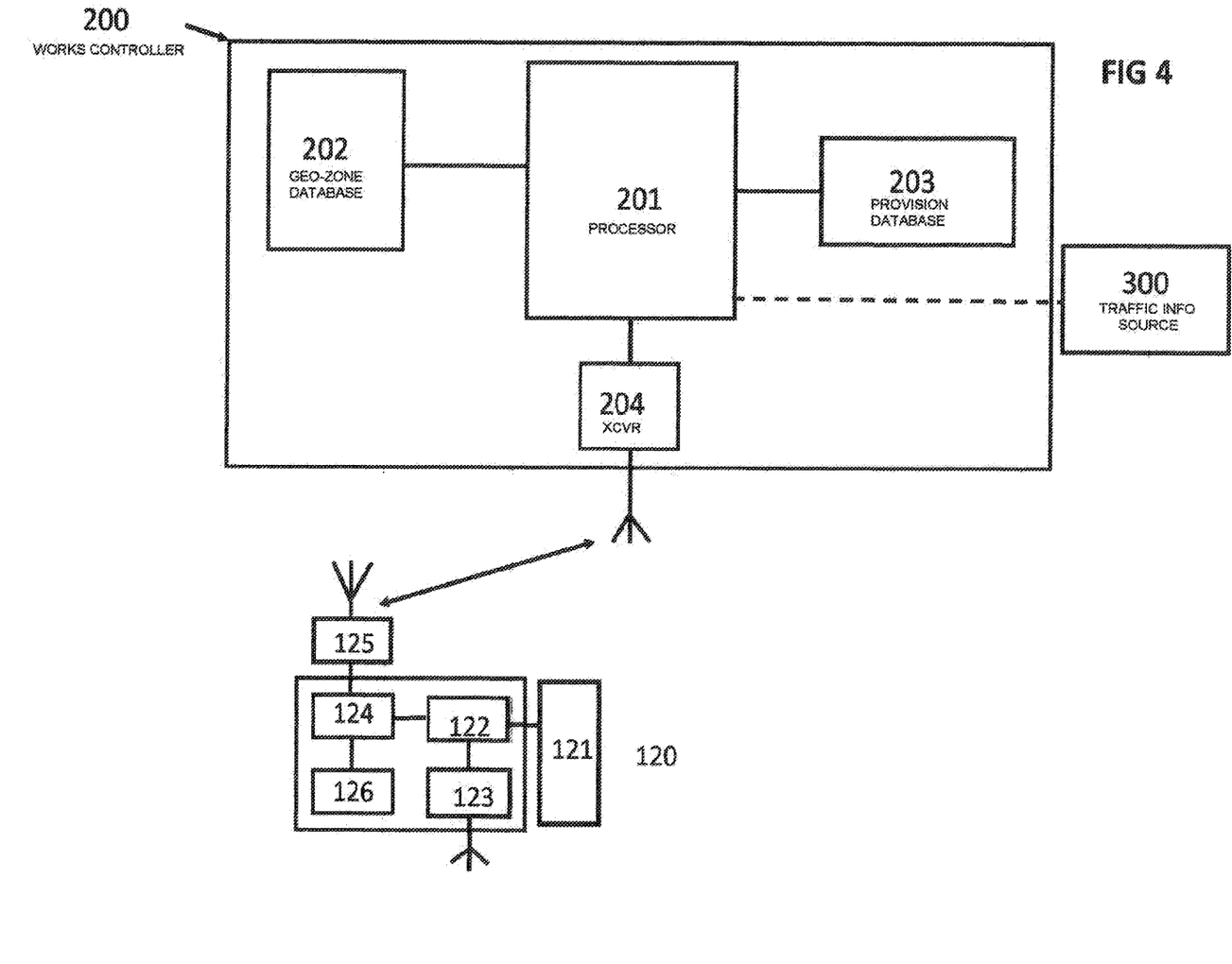
FIG. 4 is a schematic of a system used to vary the duration that the traffic lights permit traffic to flow in any one direction in response to uneven traffic volumes approaching the roadworks.

With reference to FIG. 4, in addition to a light set 121, each traffic light 120A 120B includes a signal controller 122 and associated transceiver 123 programmed to cause the light set 121 of the each traffic light 120A 120B to operate in concert to enable traffic approaching the road work from either direction to pass whilst ensuring the highway is open in one direction only at any time. Such an arrangement is well known in the art.

Each traffic light includes a further controller 124 and further transmitter 125 arranged to send a status message to a works controller 200 when the respective traffic light is switched on. The status message includes a unique identifier and location information derived from a GNS receiver 126. The further controller 124 causes further status messages to be sent each time the light set changes from displaying a red light or a green light.

The works controller 200 comprises a processor 201, geo-zone database 202, provision database 203 and transceiver 204.

Status messages transmitted by the further controller 124 via transceiver 125 are received by the works controller 200 via transceiver 204. Details of traffic lights located within the geo-zone 130 as determined from the location information within the status message are held in the provision database 203 of the works controller 200. In this way the provision database 203 will hold details for each traffic light 120 used to control traffic flow around the road works 110.

These traffic lights 120A 120B are treated as a set.

For each traffic light 120 identified by the works controller 200 in the set, the controller obtains a traffic condition indicator from an external traffic information source 300 that provides an indication of the journey time of traffic approaching the respective traffic light, and thus an indication of the length of time that traffic is queued to travel past the road works.

The preferred method of determining the traffic condition indicator is to determine a journey time between two locations on the highway 100 leading up to the respective traffic light 120A 120B using external traffic information such as provided by Google® obtained through the internet. The two locations correspond to the journey time through portions 140A 140B respectively.

The locations used for determining the traffic condition indicator may be determined automatically upon creation of the geo-zone or may be selected manually by an operator.

Each time the works controller 200 receives a status signal from a traffic light 120A 120B indicative that a traffic light has changed to display a green light, the processor 201 derives a new traffic condition indicator for the respective traffic light from the external traffic information source 300. Optionally it may derive new traffic condition indicators for each of the traffic lights 120A 120B in the set.

The new traffic condition indicator may be used in a number of ways. In one example, a determination is made as to whether the new derived traffic condition indicator is above a threshold level associated with a maximum acceptable journey time. In another example, the traffic condition indicator is compared with traffic condition indicator(s) for the other traffic lights in the set.

If it is determined through either method that the journey time for traffic approaching the traffic signal is unacceptably long or unacceptably longer than the journey times for traffic approaching the other traffic lights, the processor 201 sends an instruction via transceiver 204 to at least one (possibly all) of the traffic signals in order to prolong the duration that the green signal is displayed by the traffic signal currently displaying the green signal. Although this may be achieved in a number of ways, in order to facilitate retro-fitment of the system to existing traffic signals, the works controller 200 may send the signal to the traffic signal controller 124 displaying the green light to causes the signal controller 121 to pause or extend the countdown used to control the duration that the green light is displayed.

In a variant the further controller 124 may causes further status messages to be sent at times in addition or other than when the light set changes from displaying a red light or a green light.

Additionally, the processor 201 may be arranged to derive a new traffic condition indicator for a respective traffic light from the external traffic information source 300 at anytime, not only in response to receipt of a signal from a traffic signal.

The invention claimed is:

1. A method of operating an incursion warning system for a work zone,
the incursion warning system comprising:
a plurality of sensor units arranged about a perimeter of the work zone to detect a perimeter strike and/or breach into the work zone;
a plurality of alarm units each comprising one or more of an audio, visual or haptic alarm operable to warn a workforce of a potential danger in response to the detected perimeter strike and/or breach into the work zone; and
a control mechanism communicating with the plurality of sensor units and the plurality alarm units and including a geo-zone database that holds details of a geo-zone and a set of rules associated with the geo-zone;
the method comprising:
establishing, by the control mechanism, the geo-zone delimiting a geographical area that includes at least part of the work zone;
generating, by the control mechanism, the set of rules associated with the geo-zone for governing an operation of the plurality of alarm units in response to the detected perimeter strike and/or breach into the work zone;
receiving, by the control mechanism, location information from the plurality of alarm units and from the plurality of sensor units in the geo-zone, and
determining, by the control mechanism, a relative position(s) of each alarm unit of the plurality of alarm units and each sensor unit of the plurality of sensor units to the work zone in the geo-zone based on the location information; and
deriving, by the control mechanism, a first instruction for a first alarm unit of the plurality of alarm units determined to be in the geo-zone from the set of rules based on:
i. the position of the first alarm unit relative to the work zone;
ii. the position of the second alarm unit of the plurality of alarm units relative to the work zone; and
iii. a location of the detected perimeter strike and/or breach into the work zone,
wherein the first instruction is derived in response to a change in a position of the first alarm unit and/or a change in a position of the second alarm unit and/or a status message from one or more of the sensor units within the geo-zone indicative of the perimeter strike and/or breach.

2. The method according to claim 1, wherein the first instruction is derived in response to the status message from a sensor unit within the geo-zone indicative of the detected perimeter strike and/or breach; in which the first instruction is transmitted to the first alarm unit, and in which the first alarm unit, in response to receiving the first instruction operates its alarm.

3. The method according to claim 1, wherein the first instruction is transmitted to the first alarm unit to govern an operation of the first alarm unit within the geo-zone.

4. The method according to claim 1, wherein the first alarm unit is arranged to transmit a status message in response to the change in the position of the first alarm unit; and in which the first instruction is derived in response to a receipt of said status message.

5. The method according to claim 1, further comprising deriving, in response to a change in a position of the first alarm unit and/or one or more other alarm units within the geo-zone, a second instruction for the second alarm unit within the geo-zone from the set of rules based on a position of the second alarm unit and a position(s) of other alarm units within the geo-zone.

6. The method according to claim 5, wherein the second instruction is derived in response to a change in a position of the first alarm unit.

7. The method according to claim 5, wherein the second instruction is derived in response to a change in a position of the one or more other alarm units within the geo-zone.

8. An incursion warning system for a work zone comprising:
a plurality of sensor units arranged about a perimeter of the work zone to detect a perimeter strike and/or breach into the work zone;
a plurality of alarm units each comprising one or more of an audio, visual or haptic alarm operable to warn a workforce of a potential danger in response to the detected perimeter strike and/or breach into the work zone; and
a control mechanism communicating with the plurality of sensor units and the plurality alarm units and including a geo-zone database to establish a geo-zone delimiting a geographical area that includes at least part of the work zone and a set of rules associated with the geo-zone for governing an operation the plurality of alarm units in response to the detected perimeter strike and/or breach into the work zone, wherein:

the plurality of alarm units are positioned within the geo-zone;

the control mechanism is arranged to receive location information from the plurality of alarm units and from the plurality of sensor units in the work zone and determine a relative position(s) of each alarm unit of the plurality of alarm units and each sensor unit of the plurality of sensor units to the work zone in the geo-zone based on the location information; and the control mechanism is arranged to derive a first instruction for a first alarm unit of the plurality of alarm units within the geo-zone from the set of rules based on:

i. the position of the first alarm unit relative to the work zone;

ii. a position of a second alarm unit of the plurality of alarm units relative to the work zone; and iii. a location of the detected perimeter strike and/or breach into the work zone; and the first instruction is derived in response to a change in a position of the first alarm unit and/or a change in a position of the second alarm unit and/or a status message from the one or more sensor units within the geo-zone indicative of the perimeter strike and/or breach.

9. The system according to claim 8, wherein the control mechanism uses the first instruction to govern an operation of the first alarm unit within the geo-zone.

10. The system according to claim 8, wherein the control mechanism is arranged to derive a second instruction for the second alarm unit within the geo-zone from the set of rules based on a change in a position of the second alarm unit and/or a position of other ones of the plurality of alarm units within the geo-zone; the second instruction derived in response to a change in a position of the first alarm unit and/or other ones of the alarm units within the geo-zone.

11. The system according to claim 10, wherein the second instruction is different from the first instruction.

12. The system according to claim 8, wherein the first alarm unit is arranged to transmit a status message in response to a change in the position of the first alarm unit, and in which the first instruction is derived in response to a receipt of the status message.

\* \* \* \* \*